Patented Feb. 24, 1953

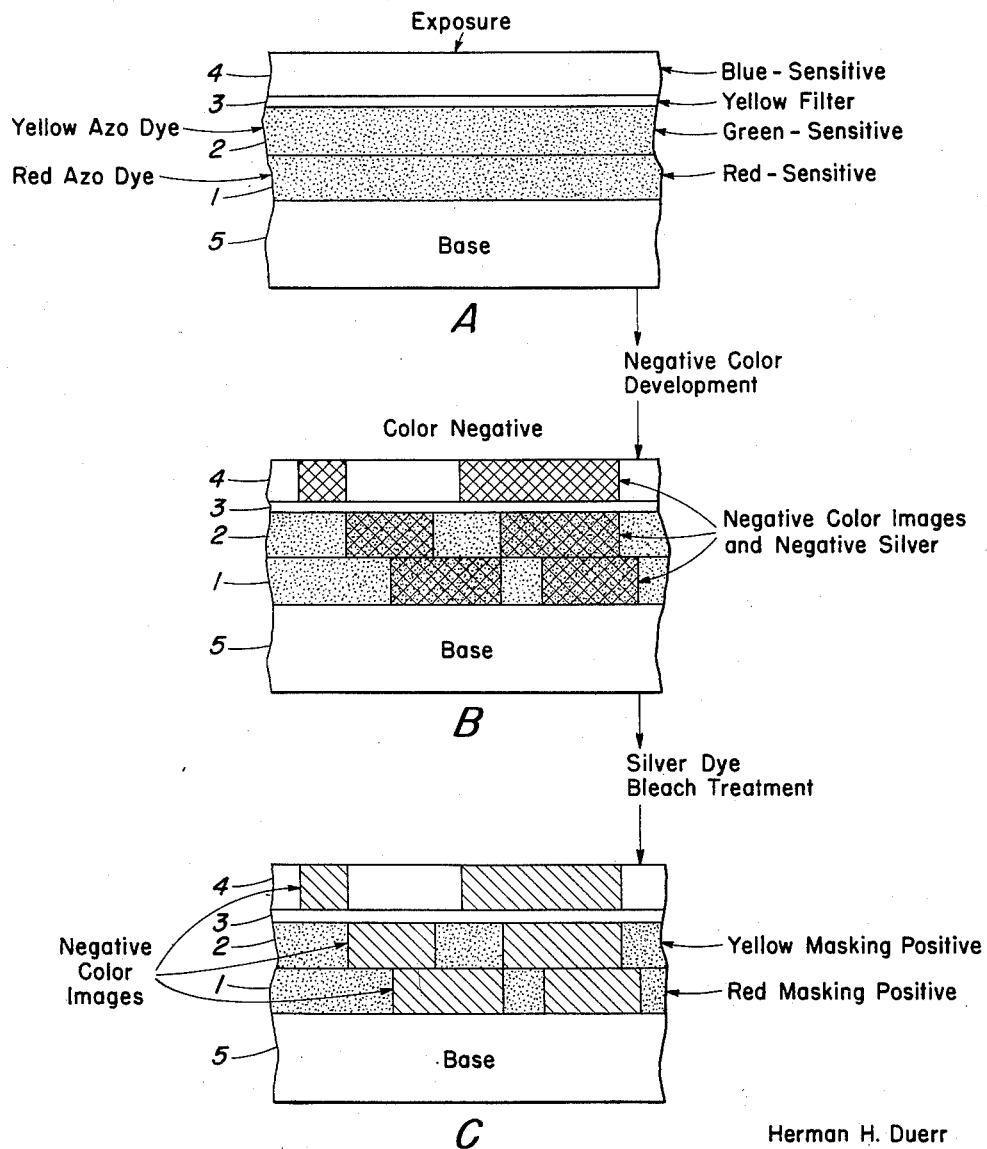

2,629,657

UNITED STATES PATENT OFFICE 2,629,657

MULTICOLOR NEGATIVE FILM WITH INTEGRAL MASKING IMAGES

Herman H. Duerr, Herbert W. Morreall, Jr., and Harold C. Harsh, Binghamton, N. Y., assignors to General Aniline & Film Corporation, New York, N. Y., a corporation of Delaware Original application May 3, 1944, Serial No. 533,833, now Patent No. 2,464,798, dated March 22, 1949. Divided and this application March 5, 1946, Serial No. 652,250

1 Claim. (Cl. 95—2)

This application relates to color photography and particularly to color negatives containing integral masking images for color correction purposes. It is a division of our copending application Serial No. 533,833, filed May 3, 1944, now Patent No. 2,464,798.

In the production of color prints or color transparencies from natural order color negatives, the multilayer color negative consists of yellow, magenta and cyan images in three different layers; the cyan image represents the red, the magenta image the green and the yellow image the blue record of the original subject. Color positive prints or transparencies may be obtained from such color negatives by direct printing on a multilayer color positive film or paper or by making color separation negatives which are then used for the making of color positive prints.

It is known that the colors, pigments or inks which are used in color photography for forming the transparent dye images are not ideal in their absorption characteristics for allowing color reproductions which are perfectly true in their color hues. Various ways and means have been devised to correct for the imperfect absorption of the dyes which are used. Generally it has not been very difficult to find suitable yellow dyes or pigments which have acceptable absorption characteristics and therefore images of such dyes need no correction in color printing processes. The magenta dyes, however, especially those which are obtained by color-forming development, and the cyan dyes do not have these desirable absorption characteristics. The magenta dyes, pigments or inks usually have very undesirable absorption in the blue and in many cases incomplete absorption in the green region. The cyan dyes usually show a considerable absorption in the blue and green region. To compensate for these deficiencies in the absorption of the magenta and cyan dyes in color negatives, it is necessary to apply color correction or "masking methods" in order to obtain color prints with true tonal values.

One well known method of obtaining such color correction consists in making a weak positive from one color record and superimposing this positive mask with a second color record when printing from the latter record. In this case an additional film and printing operation are necessary to provide the color correction mask. Furthermore, the problem of securing the proper registration of the two images makes this method complicated. It has also been proposed to incorporate in a multilayer film containing color forming components a separate emulsion layer and to convert this separate layer by special and complicated processing steps into a masking layer.

In our Patent No. 2,357,388, we have described a process wherein the difficulties and disadvantages attendant upon the use of known processes and known color negatives containing color images can be overcome by producing only in the cyan and magenta layers of negative subtractively colored multilayer film so called positive "rest images" or stained images and utilizing these images as masks in printing to compensate for the incorrect color absorption of the cyan and magenta dyes. We have now found that another method for integral masking can be used for multilayer color negative films with or without color coupling components in the individual emulsion layers which also has definite advantages over the known methods of color correction. The masks according to this method are produced within the individual layers of the color negative material itself, thereby obviating any difficulties of registration. This new method of color correction is simple and self-controlling in operation.

The invention will be more readily understood when read in connection with the accompanying drawing, the single figure of which shows a flow diagram of the color negative exposure and development procedure which results in the color corrected or masked color negative transparency. The flow diagram shows three cross-sections of the film labeled A, B, and C, respectively, each indicating a step in the process.

The first step, A, shows the condition of the film as it is being exposed.

The second step, B, shows the condition of the exposed film after it has been treated for negative color development.

The third step, C, shows the condition of the exposed and color developed film after it has been submitted to a silver dye bleach treatment.

Referring to the drawings and particularly to step A thereof, it will be seen that the original material comprises a base, 5, upon which are superimposed three silver halide emulsion layers, one of which, indicated by the numeral 1, is red sensitive; another of which, indicated by the numeral 2, is green sensitive; and a third of which, indicated by the numeral 4, is blue sensitive. On top of the green sensitive or so-called "magenta layer" there is a gelatine filter layer 3 containing colloidal silver or a fogged emulsion containing a yellow azo dye which can be destroyed in the presence of silver in a dye-silver bleaching bath. Suitable yellow azo dyestuffs for this purpose would be, for instance, Fastusol Yellow LRA (Benzo Fast Yellow RL, C. I. 349 A). Suitable colloidal silver filter layers are disclosed in U. S. P. 2,220,187.

The red sensitive layer, layer 1, may contain a non-diffusing color coupling component capable of being developed to a cyan dye image with a color developer comprising an aromatic amino developing agent such as diethyl-para-phenyl-amine-diamine. We have found that suitable cyan dye images may be produced from the color components disclosed in U. S. P. 2,179,238, 2,186,733 and 2,224,329. Specific examples of such color components are, for instance, 3.5-di-(phenylamino)phenol, abietyl-amino-naphthol, 1-N-stearyl-4-N-(1 - hydroxy - 2' - naphthoyl)-phenylene-diamine sodium sulfonate and the like. The green sensitive layer 2 may contain a color coupling component capable of forming a magenta dye with a suitable color developer as above. Satisfactory color components for the magenta image are the non-diffusing components described in U. S. Patents 2,178,612 and 2,179,238. Examples of such components are the condensation product of meta-amino-phenyl-methyl-pyrazolone and the mixed polymer of vinyl chloride and maleic acid anhydride, 1[myristyl amino 2-sulfo]phenyl-3-methyl-5-pyrazolone, and the like. The blue sensitive layer 4 contains a color coupling component capable of forming a yellow dye image with a color developer as above. Satisfactory components for this layer are the non-diffusing yellow color components described in U. S. Patents 2,179,238 and 2,224,329, examples of which are terephthaloyl-bisacetic acid anilide-p'-carboxylic acid, and the like.

The multilayer film of the figure having the cyan, magenta and yellow color components in the respective layers 1, 2 and 4, is treated so as to produce a yellow or red azo dye masking image in the cyan layer and a yellow azo dye masking image in the magenta layer. This is accomplished by incorporating a red azo dye of low color density in the cyan layer and a yellow azo dye of low color density in the magenta layer when the film is being made. The yellow and red azo dyes which are so used in the magenta and cyan layers preferably should be substantive to gelatine or contain groups so that they can be precipitated with precipitating agents such as calcium lactate and diphenyl-guanidine or β-naphthyl-bi-guanide so as to make them non-diffusing. These azo dyes must also be capable of being destroyed by a suitable bleach bath in the presence of silver, for instance, thiourea in acid solution. Azo dyes suitable for this purpose are, for instance, Walk Yellow O, Xylen Walk Yellow, Fastusol Yellow L. R. A. (C. I. 349 A), Extra, Brilliant Purpurine (Schultz 423, 1931, 7th edition), Supranol Brilliant Red B, Congo Red (Schultz 360), Cotton Red 4B (Schultz 448), and Direct Red (Schultz 439).

A preferred method of processing the film in order to obtain a suitable integral masking image in the multicolor negative described above wherein the azo dyes are incorporated in the cyan and magenta layers is as follows:

After exposure to a colored subject of a multilayer color negative film containing the color coupling components in the cyan, magenta and yellow layers 1, 2 and 4, respectively, the film is color developed in a color developer, for instance, a diethyl-para phenylene-diamine developer such as one of the following composition:

| | Grams |
|---|---|
| Sodium sulfite | 1 |
| Diethyl-para-phenylene-diamine | 2 |
| Sodium carbonate | 50 |
| Potassium bromide | 2 |
| Water to make 1000 cc. | |

This color development produces the negative color image illustrated in the drawing step B. Referring to said step B, the top layer 4 contains at this step a yellow colored negative image together with a negative silver image, the filter layer 3 has not been affected in the case where a layer of colloidal silver dispersed in gelatin has been used. If a fogged emulsion containing a yellow azo dye has been used for the filter, this layer would contain a uniform silver deposit together with a uniformly distributed yellow azo dye. The magenta layer 2 contains the uniformly distributed yellow azo dye in low concentration plus a magenta colored negative image in situ with a negative silver image. The cyan layer 1 contains a uniformly distributed red azo dye in low concentration plus a cyan colored negative image in situ with a negative silver image. The film is now fixed and washed by the usual methods. It is then treated in a silver dye bleach bath which has no irreversible effect upon azo methine or quinone imine dyes produced by color development. Acid thiourea and potassium thiocyanate baths, of which the following are typical examples, have been found suitable for this purpose:

| | I | II | III |
|---|---|---|---|
| Thiourea gms | 20 | 50 | |
| KCNS gms | | | 50 |
| HCl (conc.) cc | 10 | | 60 |
| Citric acid gms | | 25 | |
| Water to make cc | 1,000 | 1,000 | 1,000 |

Similar silver dye bleach baths may be substituted which contain, in place of the thiourea or potassium thiocyanate, any nitrogen compound containing a thioketo group which is water soluble or can be water solubilized. Further examples of such compounds are: rhodanine, thiohydantoin, thiourazole, and thiotetrazoline. Any water soluble inorganic thiocyanate and thiourea-dioxide may also be used.

The yellow azo dyestuff in the magenta layer 2 and the red azo dyestuff in the cyan layer 1 are destroyed in situ with the negative silver in said magenta and cyan layers by the silver dye bleach bath. The negative color images which have been produced by color-forming development are little if any affected by the acid thiourea bath. In case the color densities of these color images, however, have been decreased by the acid, the color can be brought back by a short rinse in a diluted sodium carbonate solution.

The azo dyes in the cyan and magenta layers are bleached out proportionally in all places where negative silver has been developed in the original color development and masking positive dye images of low density are formed in these two layers. The drawing step C illustrates the condition of the layers at this stage of the procedure. The dotted areas in layers 1 and 2 represent the yellow and red positive masking images in the magenta and cyan layers respectively. The contrast of these masking images is controlled by the bleaching time in the acid thiourea silver-dye bleach bath and by the original azo dye concentration in the layers. The residue of negative silver contained in the layers can be bleached out in a regular ferricyanide bleach bath such as one of the following composition:

Potassium ferricyanide, 10 grams
Water to make 1000 cc.

Finally the film is fixed in a standard fixing bath of for instance 10% hypo.

The following example will serve to further illustrate our invention, it being understood that the invention is not limited thereto. Except as otherwise noted, the parts are by weight.

*Example*

To 1000 cc. of a panchromatic-sensitized silver halide emulsion, 10 grams of the cyan color former 1-N-stearyl-4-N-(1-hydroxy-2'-naphthoyl) phenylenediamine sulfonic acid sodium salt are added. In addition to the color former 0.4 gram of Congo red is added to the emulsion. The emulsion is coated on a support producing a dry emulsion thickness of approximately 6 to 8 mu. A green-sensitive emulsion layer containing 1[myristyl amino 2-sulfo]phenyl-3-methyl-5-pyrazolone as a non-diffusing magenta color component is coated on top of a cyan layer. This layer, in addition to the non-diffusing magenta color component, contains 0.6 gram of Fastusol Yellow L. R. A. (C. I. 349 A). A yellow filter layer and blue sensitive emulsion layer containing terephthaloyl-bisacetic acid anilide-p'-carboxylic acid as a non-diffusing color component for yellow are then coated on the green-sensitive emulsion layer. After exposure and color development for approximately 10 minutes at 70° F. in the following color developer:

| | Grams |
|---|---|
| Diethyl paraphenylenediamine hydrochloride | 3 |
| Sodium carbonate, monohydrate | 50 |
| Potassium bromide | 2 |
| Water to make 1000 cc. | | the film is fixed in a fixing bath of the following concentration:

Sodium thiosulfate, 100 grams
Water to make 1000 cc.

The film now contains a cyan image in the panchromatic bottom layer in situ with the negative silver image and a magenta image in the green-sensitive emulsion layer also in situ with the negative silver image. In addition to the cyan and magenta images, these layers are uniformly colored red and yellow respectively by the Congo Red and Fastusol Yellow dyes added thereto. The positive red masking image in the cyan layer and the positive yellow masking image in the magenta layer are now formed by bleaching the respective red and yellow azo dyes in situ with the negative silver image by treating the film in an acid thiourea bath in the concentration No. I of the table in column 4. The red azo dye in the cyan layer and the yellow azo dye in the magenta layer will be bleached out in proportion to the density of the negative silver and a low density positive red masking image is formed in the cyan layer and a low density positive yellow masking image in the magenta layer.

Various modifications of this invention will occur to persons skilled in the art and it is, therefore, understood that we do not intend to be limited in the patent granted except as required by the claim.

We claim:

Subtractively colored multilayer transparent negatives suitable for printing comprising a base and three layers superimposed thereon, said layers containing in the innermost layer transparent cyan negative images, in the next adjacent layer transparent magenta negative images and in the outermost layer transparent yellow negative images and containing in the cyan layer red azo dye positive images of low color density and in the magenta layer yellow azo dye positive images of low color density.

HERMAN H. DUERR.
HERBERT W. MORREALL, Jr.
HAROLD C. HARSH.

REFERENCES CITED

The following references are of record in the file of this patent:

UNITED STATES PATENTS

| Number | Name | Date |
|---|---|---|
| 2,193,931 | Michaelis | Mar. 19, 1940 |
| 2,252,718 | Mannes et al. | Aug. 19, 1941 |
| 2,449,966 | Hanson | Sept. 21, 1948 |

FOREIGN PATENTS

| Number | Country | Date |
|---|---|---|
| 512,608 | Great Britain | Sept. 21, 1939 |
| 541,266 | Great Britain | Nov. 20, 1941 |